United States Patent
Danilewicz et al.

[15] 3,694,504
[45] Sept. 26, 1972

[54] N-(3-CHLOROBENZENESULFONYL) ACETAMIDINES

[72] Inventors: John C. Danilewicz, Sandwich, England; Michael Szelke, Great Mongeham, near Deal Ireland

[73] Assignee: Pfizer Inc., New York, N.Y.

[22] Filed: May 6, 1970

[21] Appl. No.: 35,295

[30] Foreign Application Priority Data

May 19, 1969    Great Britain..........25,372/69

[52] U.S. Cl........260/556 AR, 424/321, 260/556 AC
[51] Int. Cl..............................................C07c 143/78

[58] Field of Search................................260/556 AR

[56] References Cited

OTHER PUBLICATIONS

C. A. 43: 6234a (1949) Geigy

Primary Examiner—Henry R. Jiles
Assistant Examiner—S. D. Winters
Attorney—Connolly and Hutz

[57] ABSTRACT

Novel N-(3-chlorobenzenesulfonyl)acetamidines useful in the treatment of hypertension are disclosed.

6 Claims, No Drawings

N-(3-CHLOROBENZENESULFONYL) ACETAMIDINES

BACKGROUND OF THE INVENTION

This invention relates to certain novel therapeutic agents. More particularly, it relates to N-(3-chlorobenzenesulfonyl) acetamidines and their usefulness as regulators of the cardiovascular system, in particular as anti-hypertensive agents.

Accordingly, the present invention discloses compounds having the formula:

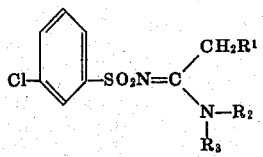

wherein $R_1$ is selected from the group consisting of hydrogen, phenyl and monosubstituted phenyl, and $R_2$ and $R_3$ are each selected from the group consisting of hydrogen, alkyl of from one to five carbon atoms, phenyl and mono-substituted phenyl, said phenyl substituents being halogen, alkyl of from one to five carbon atoms or alkoxy of from one to five carbon atoms, provided that $R_2$ and $R_3$ are not both phenyl or substituted phenyl.

A particularly preferred embodiment of the above described feature of the invention concerns the compound indicated by the above formula when $R_1$, $R_2$, and $R_3$ are each hydrogen.

Typical compounds of this invention include N-(3-chlorobenzenesulfonyl) acetamidine, N-(3-chlorobenzenesulfonyl)-2-phenylacetamidine, N-(3-chlorobenzenesulfonyl)-N', N'-dimethylacetamidine, N-(3-chlorobenzenesulfonyl)-N'- phenylacetamidine and N-(3-chlorobenzenesulfonyl)-N'-(4-chlorophenyl) acetamidine.

In addition, there is disclosed a composition in dosage unit form useful for alleviating hypertension in a host comprising a pharmaceutical carrier and from about 10 mg. to about 2,000 mg., preferably from about 25 mg. to about 300 mg. of a compound having the formula:

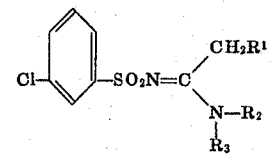

wherein $R_1$ is selected from the group consisting of hydrogen, phenyl and substituted phenyl, said substituent being selected from the group consisting of halogen, alkyl of from one to five carbon atoms and alkoxy of from one to five carbon atoms; and $R_2$ and $R_3$ are each selected from the group consisting of hydrogen alkyl of from one to five carbon atoms, phenyl and substituted phenyl, said substituent being halogen, alkyl of from 1 to 5 carbon atoms or alkoxy of from one to five carbon atoms, except the $R_2$ and $R_3$ cannot both be pheny of substituted phenyl.

A preferred embodiment of the above described composition concerns the utilization of the compound wherein $R_1$, $R_2$, and $R_3$ are each hydrogen.

DETAILED DESCRIPTION OF THE INVENTION

The compounds of this invention can be made by three routes described below and outlined in the following sequences:

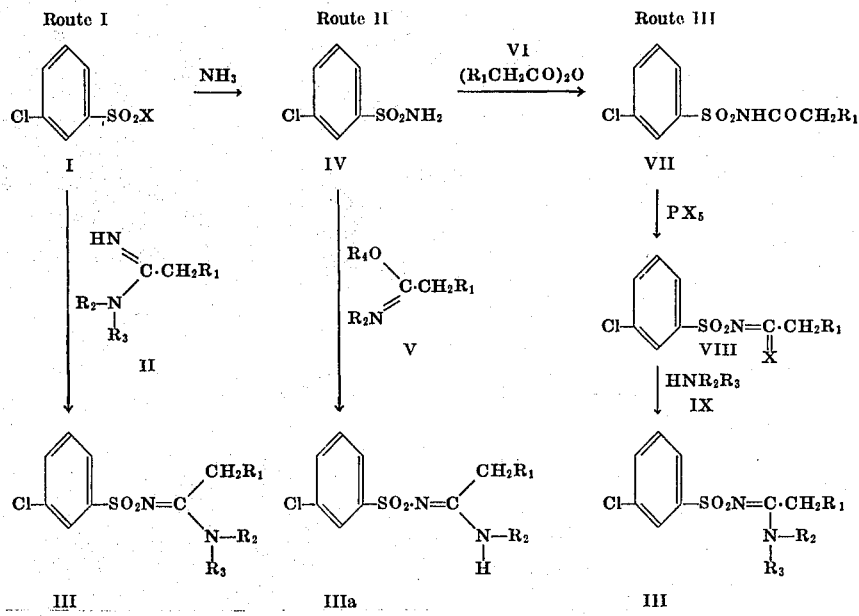

ROUTE I

A 3-chlorobenzenesulfonyl halide (I) such as 3-chlorobenzensulfonyl chloride (prepared by the method of Meerwein et al., Chem Ber. 90, 841 (1957)) is dissolved in an anhydrous solvent such as dry pyridine and slowly reacted with an amidine (II) such as acetamidine or 2-phenylacetamidine also dissolved in dry pyridine, with the elimination of a hydrogen halide (HX). The reaction mixture is allowed to stand at ambient temperature for about two days and the solvent is then removed by suitable means, i.e., evaporation. The resultant residue is then washed with water and recrystallized from chloroform or any other suitable solvent to give a N-(3-chlorobenzenesulfonyl) acetamidine (III).

ROUTE II

Where $R_2$ or $R_3$ is hydrogen 3-chlorobenzenesulfonamide (IV), prepared by reacting 3-chlorobenzenesulfonyl chloride with ammonia (method of Kieselinsky, *Annalen*, 1876, 180, 108) is combined with an imidate alkyl ester (V) such as ethyl acetimidate hydrochloride, in a solvent such as acetone, in the presence of an alkalizing agent such as potassium carbonate, and refluxed for about 4 to 5 hours with the elimination of an alcohol ($R_4OH$), wherein $R_4$ is lower alkyl of from one to five carbon atoms. The mixture is allowed to cool and then filtered and the pH of the filtrate is adjusted with a suitable weak acid, such as acetic acid to about 6.0 to 6.5, the preferred pH being 6.2.

The solvent is then removed by a suitable means, i.e., under vacuum, and the resultant acetamidine (IIIa) recrystallized from a suitable solvent such as aqueous isopropanol or the like.

ROUTE III

3-Chlorobenzenesulfonamide (IV) is reacted with an acid anhydride, such as acetic anhydride, in an anhydrous solvent, such as dry pyridine and heated at about 90°–110°, the preferred temperature being 100°, for about 2 hours. The solvent is then removed by suitable means, the resulant residue is washed with water and recrystallized from aqueous alcohol to give a N-substituted -3- chlorobenzenesulfonamide (VII), such as N-acetyl-3-chlorobenzenesulfonamide or N-phenylacetyl-3-chlorobenzenesulfonamide.

Compound VII and a phosphorus pentahalide, i.e., phosphorus pentachloride, are melted together at about 50°–70°/100 mm, the preferred temperature being 60°/100 mm, for about two hours. The phosphorus oxyhalide formed is distilled leaving a crude residue of a 3-chlorobenzenesulfonylimidoyl halide (VIII) such as N-(3-chlorobenzenesulfonyl)-acetimindoyl chloride or a N-(3-chlorobenzenesulfonyl)phenylacetimidoyl chloride. Compound VIII is then reacted with ammonia or an amine such as dimethylamine, aniline or 4-chloraniline with ether as the solvent. The reaction, which is usually carried out at room temperature is allowed to proceed for about 5 minutes to 18 hours depending on the amine, i.e., 5 minutes often suffices for dimethylamine whereas 18 hours may be required for substantially complete conversion with aniline. The reaction mixture is then filtered and the solvent removed by suitable methods such as evaporation under vacuum. The resultant product (III) is the further purified by washing with a suitable solvent such as diisopropylether and recrystallizing from a solvent mixture such as ether-light petroleum or benzene-light petroleum.

As previously indicated, the compounds of this invention are therapeutically useful for treatment of hypertension. This is due to their ability to lower the blood pressure of hypertensive subjects to a statistically significant degree. For instance, N-(3-chlorobenzenesulfonyl)acetamidine, a typical agent of this invention, has been found to lower the blood pressure of renal hypertensive rats to a significant degree (e.g., up to 25 mm.Hg.) when orally administered to them at 20 mg./kg. for a period of three days. It was also found to lower the blood pressure of renal hypertensive dogs at 10 mg./kg. orally, with the effect reaching a maximum of 20 mm. Hg. after 2 hours subsequent to the drug administration. The compounds of this invention may be administered by either the oral or parenteral routes of administration and in ether case, without causing significant unwanted side effects to occur in the subject so being treated. In general, these compounds are ordinarily administered in dosages ranging from about 0.15 mg. to about 30 mg., preferably from about 0.3 mg. to about 5 mg., per kg. of body weight per day, depending upon the weight and condition of the subject being treated and the particular route of administration chosen.

The compounds of this invention may be administered either alone or in combination with pharmaceutically acceptable inert carriers and in both single and multiple dosages. More particularly, the novel compounds of this invention can be administered in a wide variety of different dosage forms, i.e., they may be combined with various pharmaceutically acceptable inert carriers in the form of tablets, capsules, aqueous suspension, injectable solutions, elixirs, syrups and the like. Such carriers include solid diluents, or fillers, sterile aqueous media and varioys non-toxic organic solvents, etc. Moreover, such oral pharmaceutical compositions can be suitable sweetened and/or flavored by means of varous agents of the type commonly employed for just such purposes. In general, the therapeutically-effective compounds of the invention are present in such dosage forms at concentration levels ranging from between about 0.5 percent to about 90 percent by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as starch, microcrystalline cellulose, alginic acid and certain complex silicates, together with binding agents such as polyvinylpyrrolidone, sucrose, gelation and acacia and dissolution aids such as sodium lauryl sulfate. Additionally, lubricating agents such as magnesium stearate and talc are often very useful for tabletting purposes. Solid compositions of a similar type may also be employed as fillers in soft and hard-filled gelating capsules; preferred materials in this connection would also include lactose as well as high molecular weight polyethylene glycols. When aqueous suspensions and/or elixirs are desired for oral administration, the essential active ingredient therein may be combined with various sweetening or flavoring agents, coloring matter or dyes, and if so desired, emulsufying and/or suspending agents as well, together with such diluents as water, ethanol, propylene glycol, glycerin and various combinations thereof.

For purposes of parenteral administration, solutions of these compounds in sesame or peanut oil or in aqueous-propylene glycol of N,N-dimethylformamide may be employed, as well as sterile aqueous solutions of the corresponding water-soluble, non-toxic mineral and organic acid addition salts. Such aqueous solutions should be suitable buffered, if necessary, and the liquid diluent first rendered isotonic with sufficient saline or glucose. These particular aqueous solutions are especially suitable for intravenous, intramuscular, subcutaneous and intraperitoneal injection routes.

The invention is illustrated by the following examples:

EXAMPLE I

N(3-Chlorobenzenesulfonyl) acetamidine (by route I)

3-Chlorobenzenesulfonyl chloride (Meerwein, Dittmar, Göllner, Hafner, Mensch and Steinford, *Chem. Ber.*, 90 841 (1957); 200 g.) dissolved in dry pyridine (1 liter) is added dropwise with cooling to a solution of acetamidine (from the hydrochloride, 400 g.) in dry pyridine (1 liter). The mixture is allowed to stand at room temperature for 2 days and the solvent is then removed by evaporation under vacuum. The white crystalline residue is triturated with water and the insoluble portion is filtered off, thoroughly washed with water and dried. Recrystallization from chloroform gives N-(3-chlorobenzenesulfonyl) acetamidine (121 g.) m.p. 126°–127°.

Anal.Calcd. for: $C_8H_9ClN_2O_2S$: C, 41.29; H, 3.90; N, 12.04.

Found: C, 41.49; H, 4.19; N, 12.07.

EXAMPLE II

N-(3-Chlorobenzenesulfonyl)-2-phenylacetamidine (by route II)

N-(3-chlorobenzenesulfonyl)-2-phenylacetamidine is prepared from 3-chlorobenzenesulfonyl chloride and 2-phenylacetamidine following the procedure of Example I. After recrystallization from benzene it has m.p. 152°.

Anal.Calcd. for:$C_{14}H_{13}ClN_2O_2S$:C, 54.47; H, 4.22; N, 9.07.

Found: C, 54.63; H, 4.24; N, 8.94

EXAMPLE III

N-(3-Chlorobenzenesulfonyl) acetamidine (by route II)

3-Chlorobenzenesulfonamide (Kieselinsky, *Annalen*, 1876, 180, 108; 9.6 g.), ethyl acetimidate hydrochloride (9.25 g.) and potassium carbonate (10.9 g.) are refluxed 4 to 5 hours in acetone. The mixture is then filtered, and the pH of the filtrate is adjusted to 6.2 with a acetic acid. Solvents are removed under vacuum, and the solid residue is crystallized twice from aqueous isopropanol giving N-(3-chlorobenzenesulfonyl) acetamidine (5.6 g.) m.p. 124°–127°.

EXAMPLE IV

N-(3-Chlorobenzenesulfonyl)-N′,N′-dimethylacetamidine (by route III)

3-chlorobenzenesulfonamide (4.8 g.) and acetic anhydride (2.6 g.) are heated 2 hours at 100° in dry pyridine (25 ml.). Removal of pyridine and treatment of the residue with water gives N-acetyl-3-chlorobenzenesulfonamide which on crystallization from aqueous ethanol has a m.p. 138°–140°; n.m.r., δ 2.05 (s; $CH_3$).

Anal.Calcd.for $C_8H_8ClNO_3S$: C, 41.12; H, 3.45; N, 5.99.

Found: C, 41.40; H, 3.60; N, 5.95.

N-Acetyl-3-Chlorobenzenesulfonamide (7 g.) and phosphorus pentachloride (6.3 g.) are melted together at 60°/100 mm. for 2 hours. The phosphorus oxychloride formed is distilled, and the crude residue of N-(3-chlorobenzenesulfonyl)-acetimindoyl chloride (8 g.) n. m. r. δ 2.70 (s; $CH_3$) is used in the next stage.

N-(3-chlorobenzenesulfonyl)-acetimidoyl chloride (10 g) and dimethylamine (50 ml.) are stirred in ether (100 ml) at 25° for 5 minutes. The mixture is filtered and removal of ether from the filtrate by evaporation under vacuum gives an oil. Trituration with diisopropylether and recrystallization from ether-light petroleum gives N-(3-chlorobenzenesulfonyl)-N′N′-dimethylacetamidine (2.5 g.) m.p. 69°; ν max 1560 cm.$^{-1}$; n.m.r. δ 2.45 (s; $CH_3$),3.05–3.10 (d; N—$CH_3$).

Anal.Calcd. for; $C_{10}H_{13}ClN_2O_2S$: C, 46.06; H, 5.03; N, 10.74.

Found: C, 45.98; H, 5.20; N, 10.49.

EXAMPLE V

N-(3-Chlorobenzenesulfonyl)-N′-phenylacetamidine (by route III)

To N-(3-chlorobenzenesulfonyl)-acetimidoyl chloride (7 g.) in ether is added aniline (3 g.) in ether. After 18 hours at 25° the mixture is filtered and the filtrate is evaporated to dryness. The product is crystallized from benzene-light petroleum gives N-(3-chlorobenzenesulfonyl)-N′-phenylacetamidine (2.2 g.).

Anal.Calcd. for $C_{14}H_{13}ClN_2O_2S$:C, 54.45; H, 2.24; N, 9.07.

Found: C, 48.82; H, 4.48; N, 8.84.

EXAMPLE VI

N-(3-chlorobenzenesulfonyl)-N′-(4-chlorophenyl)-acetamidine (by route III)

This compound is prepared following the procedure of Example V but using 4-chloroaniline instead of aniline. The product is re-crystallized from hexane-dioxane and had m.p. 177°.

Anal.Calcd. for $C_{14}H_{12}Cl_2N_2 O_2S$: C, 48.99; H, 3.52; N, 8.16.

Found: C, 48.82; H, 3.70; N, 8.09.

EXAMPLE VII

The compounds listed below are prepared following the procedure of Example V but using the indicated substituted aniline instead of aniline:

N-(3-chlorobenzenesulfonyl)-N′-(4-methylphenyl)-acetamidine (from 4-methylaniline), N-(3-chlorobenzenesulfonyl)-N′-(4-pentylphenyl)-acetamidine (from 4-pentylaniline), N-(3-chlorobenzenesulfonyl)-N′-(4-methoxyphenyl)-acetamidine (from 4-methoxyaniline), and N-(3-chlorobenzenesulfonyl)-N′-(4-pentoxyphenyl)-acetamidine (from 4-pentoxyaniline).

EXAMPLE VIII

The following compounds are prepared by the procedure of Example I by reacting 3-chlorobenzenesulfonyl chloride with the indicated acetamidine:

N-(3-chlorobenzenesulfonyl)-2-(4-chlorophenyl)acetamidine (from 2-(4-chlorophenyl)acetamidine), N-(3-chlorobenzenesulfonyl)-2-(4-methylphenyl)acetamidine (from 2-(4-methylphenyl)acetamidine), N-(3-chlorobenzenesulfonyl)-2-(4-pentyphenyl)acetamidine (from 2-(4-pentylphenyl)acetamidine), N-(3-chlorobenzenesulfonyl)-2-(4-methoxyphenyl)acetamidine (from 2-(4-methoxyphenyl)acetamidine), and N-(3-chlorobenzenesulfonyl)-2-(4-pentoxyphenyl)acetamidine (from 2-(4-pentoxyphenyl)acetamidine.

EXAMPLE IX

Formulation of tablets and capsules of N-(3-chlorobenzenesulfonyl)acetamiine described in Examples I and III is effected using the following ingredients:

| Tablets | mg./tablet |
| --- | --- |
| N-(3-chlorobenzenesulfonyl)acetamidine | 25.0 |
| Dicalcium phosphate | 120.0 |
| Corn starch | 20.0 |
| Magnesium stearate | 1.6 |
| Sodium lauryl sulfate | 0.2 |

The ingredients are blended and compressed. The compressed pieces are then broken into granules and compressed into finished tablets.

| Capsules | mg./capsule |
| --- | --- |
| N-(3-chlorobenzenesulfonyl)acetamidine | 25.0 |
| Corn starch | 127.0 |
| Microcrystalline cellulose | 127.0 |
| Magnesium stearate | 5.4 |
| Sodium lauryl sulfate | 0.6 |

The ingredients are blended and filled into hard gelatin capsules of suitable size.

What is claimed is:

1. A compound of the formula:

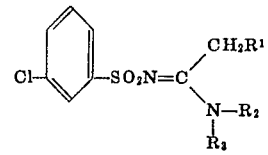

wherein $R_1$ is selected from the group consisting of hydrogen, phenyl and mono-substituted phenyl, and $R_2$ and $R_3$ are each selected from the group consisting of hydrogen, alkyl of from one to five carbon atoms, phenyl and mono-substituted phenyl, said phenyl substituents being halogen, alkyl of from one to five carbon atoms or alkoxy of from one to five carbon atoms, provided that $R_2$ and $R_3$ are not both simultaneously phenyl or substituted phenyl.

2. A compound of claim 1 wherein $R_1$, $R_2$ and $R_3$ are hydrogen.

3. A compound of claim 1 wherein $R_1$ is phenyl and $R_2$ and $R_3$ are hydrogen.

4. A compound of claim 1 wherein $R_1$ is hydrogen and $R_2$ and $R_3$ are methyl.

5. A compound of claim 1 wherein $R_1$ and $R_2$ are hydrogen and $R_3$ is phenyl.

6. A compound of claim 1 wherein $R_1$ and $R_2$ are hydrogen and $R_3$ is 4-chlorophenyl.

* * * * *